(12) United States Patent
De Jong (10) Patent No.: US 10,082,578 B2
(45) Date of Patent: Sep. 25, 2018

(54) PPP-RTK METHOD AND SYSTEM FOR GNSS SIGNAL BASED POSITION DETERMINATION

(71) Applicant: Fugro N.V., Leidschendam (NL)

(72) Inventor: Cornelis Dick De Jong, Delft (NL)

(73) Assignee: FUGRO N.V. (NL)

( * ) Notice: Subject to any disclaimer, the term of this patent is extended or adjusted under 35 U.S.C. 154(b) by 544 days.

(21) Appl. No.: 14/438,210

(22) PCT Filed: Oct. 25, 2013

(86) PCT No.: PCT/NL2013/050747
§ 371 (c)(1),
(2) Date: Apr. 23, 2015

(87) PCT Pub. No.: WO2014/065664
PCT Pub. Date: May 1, 2014

(65) Prior Publication Data
US 2015/0293233 A1 Oct. 15, 2015

(30) Foreign Application Priority Data
Oct. 25, 2012 (NL) ...................................... 2009695

(51) Int. Cl.
*G01S 19/07* (2010.01)
*G01S 19/04* (2010.01)
(Continued)

(52) U.S. Cl.
CPC .............. *G01S 19/07* (2013.01); *G01S 19/04* (2013.01); *G01S 19/43* (2013.01)

(58) Field of Classification Search
CPC ........... G01S 19/07; G01S 19/43; G01S 19/04
See application file for complete search history.

(56) References Cited

U.S. PATENT DOCUMENTS 5,471,217 A * 11/1995 Hatch et al. ............ G01S 19/43
9,274,230 B2 * 3/2016 Artushkin et al. ...... G01S 19/43

FOREIGN PATENT DOCUMENTS

WO  WO 95/18977 A1   7/1995 ............. G01S 19/43
WO  2010034694       4/2010
(Continued)

OTHER PUBLICATIONS

Engelbart, D. et al.; "Integrated Ground-Based Remote Sensing Stations for Atmospheric Profiling"; 2006; Luxembourg: Office for Official Publication of the European Communities;pp. 1-385.
(Continued)

Primary Examiner — Bernarr E Gregory
(74) Attorney, Agent, or Firm — Polsinelli PC (57) ABSTRACT

GNS signal correction system and method for calculating GNSS corrections, and complementary mobile and mobile position determination method based on these GNSS corrections. The methods employ satellite-single-differenced mixed code-and-phase system hardware delays in modelling carrier phase system observables. These system hardware delays are dynamically estimated by the signal correction system using a dynamic system state model. The estimated system hardware delays are transmitted to the mobile, which applies these delays to a dynamic mobile state model, in order to improve the accuracy and/or convergence time of mobile position estimations.

23 Claims, 4 Drawing Sheets

(51) Int. Cl.
*G01S 19/43* (2010.01)
*G01S 19/00* (2010.01)

(56) References Cited

FOREIGN PATENT DOCUMENTS

WO 2010103082 9/2010
WO 2011034614 3/2011

OTHER PUBLICATIONS

Ge, M. et al.; "Resolution of GPS carrier-phase ambiguities in Precise Point Positioning (PPP) with daily observations"; Nov. 24, 2006; published by Springer-Verlag 2007.

Laurichesse, D. et al.; "Integer ambiguity resolution on undifferenced GPS Phase measurements and its application to PPP"; C.N.E.S, France; ION GNSS 20th International Technical Meeting of the Satellite Division, Sep. 25-28, 2007; Fort Worth, TX; pp. 839-848.

Laurichesse, D. et al.;"Real Time Zero-difference Ambiguities Fixing and Absolute RTK"; ATOS Origin, Toulouse, France; ION NTM 2008, Jan. 28-30, 2008; San Diego, CA; pp. 747-755.

Mervart, L. et al.; "Precise Point Positioning With Ambiguity Resolution in Real-Time"; GPS Solutions Inc.; Boulder, CO, USA; 2008; pp. 1-9.

Bertiger, W. et al.; "Single receiver phase ambiguity resolution with GPS data"; Received Dec. 10, 2009; Accepted Feb. 11, 2010; US Government 2010; Published online Mar. 21, 2010 by Springer.

Takasu, Tomoji et al.; "Kalman-Filter-Based Integer Ambiguity Resolution Strategy for Long-Baseline RTK with Ionosphere and Troposphere Estimation"; Tokyo University of Marine Science and Technology; 2010; Japan.

Teunissen, P. et al.; "PPP-RTK: Results of CORS Network-Based PPP with Integer Ambiguity Resolution"; 2010; Astronautics and Aviation; Series A, vol. 42, No. 4; pp. 223-230.

Shirazian, M.; "Remarks on the quality of GPS precise point positioning using phase observations"; Licentiate Thesis in Geodesy; Stockholm, Sweden; 2012; pp. 1-56.

* cited by examiner

PPP-RTK METHOD AND SYSTEM FOR GNSS SIGNAL BASED POSITION DETERMINATION

CROSS-REFERENCE TO RELATED APPLICATIONS

This application is a national stage entry of International Application International Application No. PCT/NL2013/050747, which was filed on Oct. 25, 2013 and which claims priority to Netherlands Application No. 2009695, which was filed on Oct. 25, 2012, both of which applications are entirely incorporated by reference herein.

TECHNICAL FIELD

The invention relates to a global navigation satellite (GNS) signal correction system and to a mobile cooperating with the GNS signal correction system. In addition, the invention relates to complementary methods for calculating global navigation satellite system (GNSS) corrections and for determining a mobile position. Furthermore, the invention relates to computer program products arranged to perform the proposed methods, and a computer readable medium comprising any such computer program.

BACKGROUND

A global navigation satellite system (GNSS) is a system of satellites that can be used for determining the geographic location of a mobile receiver with respect to the earth. GNSS include GPS, Galileo, Glonass, Compass, and other positioning systems. Various global navigation satellite (GNS) correction systems are known that are configured for receiving GNSS signal data from the GNSS satellites, for processing this GNSS data, for calculating GNSS corrections from the GNSS data, and for providing these corrections to a mobile, with the purpose of achieving quicker and more accurate calculation of the mobile's geographic position.

Various position estimation methods are known wherein the position calculations are based on repeated measurement of the so-called pseudo range and carrier phase observables by earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver. Any pseudo range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles that have elapsed before a lock-in to this signal alignment has been obtained, which number is referred to as the "carrier phase ambiguity". Usually, the observables are measured i.e. sampled by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

The following definitions are used herein to define additional concepts that are commonly known and used in the field of GNSS signal processing. The term "measurement" refers herein to a sampled numeric value resulting from actual measurement of an observable. The term "dynamic state model" refers to the mathematical relations between the system state variables (i.e. a collection of variable quantities that are assumed to be sufficient for unambiguously describing and predicting the behaviour of the system, but which are not directly measurable) and the measurements (which are snapshots of measurable system parameters i.e. observables, but as such insufficient for predicting future system behaviour), as well as the expected evolution of the system state variables in time. The underlying system state variables in the system state model are dynamically estimated and intermittently corrected based on new measurements. The term "dynamic estimation" of a parameter refers herein to the process of repeatedly calculating a numeric value for this parameter at subsequent times based on the system state model, either via prediction of the assumed temporal evolution of this parameter, or via correction of the predicted value based on newly acquired measurements.

Several methods for precise point positioning (PPP) with integer ambiguity resolution (IAR) have been proposed, wherein carrier phase ambiguities are estimated in real time, via a dynamic system state model that is based on measurement of GNSS observables by a network of reference stations. The greatest challenge in each of these methods is to define a dynamic state model by means of which the repetitive state estimations can be calculated in a numerically stable manner. This is essential for robust GNSS correction calculation and subsequent accurate mobile position determination. No indication is given as to how such a system or method could be applied in the absence of such a network of reference stations. Consequently, such arrangements are largely unsuitable for remote locations where perhaps only one reference station will be viewing the same set of satellites as the rover.

SUMMARY

It would be desirable to provide an adaptable and numerically robust system and method for GNSS correction calculation, and a complementary mobile and method for mobile position determination.

Therefore, according to a first aspect, there is provided a method for calculating GNSS corrections for transmission to a mobile, using a GNS signal correction system comprising a reference station and a system signal transmitter, wherein the method comprises: —acquiring at the reference station GNSS data comprising pseudo range system observations and carrier phase system observations from a plurality of GNSS satellites transmitted over multiple epochs; —applying the GNSS data received from the reference station to a dynamic system state model having the pseudo range system observations and carrier phase system observations as measurements; —dynamically estimating satellite-single-differenced mixed code-and-phase system hardware delays for distinct carrier phase observations via the dynamic system state model, and —transmitting the mixed code-and-phase system hardware delays to the mobile in real time via the system signal transmitter.

The satellite-single-differenced floating value mixed code-and-phase hardware delays, which form a sub-set of the GNSS corrections, are estimated by the dynamic system state model for distinct carrier phase observations and satellite signal carrier frequencies. The adjective "satellite-single-differenced" refers herein to a single subtraction or difference between two parameters associated with two distinct GNSS satellites, for example a selected reference satellite and an arbitrary other satellite. The adjective "mixed code-and-phase" implies herein that the parameter in question is obtained from a mathematical operation between an original code system state parameter and an original phase system state parameter. The introduction of the mixed code-and-phase hardware delays results in an efficient parameter reduction by which singularities in the system state equations are eliminated, and by which a full rank dynamic system model is obtained. The term "delay" is used herein to indicate an initially unknown state variable (or "ambiguity") that causes a signal retardation. Where applicable, a delay should be interpreted broadly herein as also comprising delays having a negative value, corresponding with an advanced signal.

The use of satellite single differenced (floating valued) mixed code-and-phase system hardware delays in the dynamic system state model according to this aspect of the invention improves the precision of precise point positioning real time kinematic (PPP-RTK) calculations. Test results have indicated that for a mobile that receives and applies the received GNSS corrections based on the principles described herein, it is possible to obtain a real time mobile position determination with an accuracy of 1-4 cm rms or even better, depending on the distance of the mobile from the reference station(s) generating the corrections. The dynamic system state model retains the original pseudo range system observations and carrier phase system observations for distinct reference stations as distinct system measurement parameters, contrary to coupled observable models in known methods (see for example those disclosed in WO2011/034614) wherein linear combinations of pseudo range and carrier phase observables and inter-station-differenced observations are introduced to eliminate certain parameters from the dynamic state model equations. By retaining the original observables, the proposed method can be applied with either a single reference station or a network of multiple reference stations and any number of frequencies. A single reference station will already suffice, but the system may be easily adapted to include any number of reference stations, in order to improve estimation accuracy.

Preferably, the observations are acquired and the mixed code-and-phase system hardware delays are updated at a rate of 1 Hz or more. Of significance it is further preferable that the transmission of such delays to the mobile takes place at a rate of less than once per minute, preferably once per 20 s or even once per 10 s. The measurements may be single frequency, dual-frequency or multi-frequency. For dual and multi-frequency systems it is noted that code-phase delays for different frequencies are highly correlated and a single delay may be transmitted with a high update rate of perhaps once per 10-20 sec with the difference between the frequency delays being transmitted at a much lower update rate of perhaps once every minute or more. Since the difference between frequencies does not change much due to the high correlation, additional bandwidth can be made available for transmission of the single delay.

In an embodiment, the method for calculating GNSS corrections for transmission to a mobile uses a GNS signal correction system comprising only a single reference station and the mobile and reference station form a single baseline solution.

In contrast to this, in the PPP-network Real Time Kinematic (RTK) method disclosed by Teunissen et al in ref. [1], wherein real valued satellite clock delays are also dynamically estimated, a reference-station-differenced RTK network solution is dynamically estimated, and hence their method always needs a network comprising multiple reference stations.

According to an embodiment of the GNSS correction calculation method, the dynamic system state model is defined as given in the claims.

In this embodiment of the GNSS correction calculation method, the mathematical structure of the dynamic system state model is one of almost identical state equations for the original pseudo range observations and the carrier phase system observations. In this model, local atmospheric correction parameters associated with individual reference stations, i.e. the tropospheric delays and ionospheric delays, are retained. These atmospheric correction parameters can thus be estimated and exploited when useful, or otherwise discarded. By separating the atmospheric corrections, which strongly depend on earth position, from other corrections that only have a weak positional dependency e.g. the mixed code-and-phase system hardware delays, the latter may be separately transmitted to the mobile over great distances, and subsequently applied by the mobile in solving its own dynamic state model. Hence, the proposed GNS signal correction system does not require a mobile to be close to a GNSS reference station in order to receive useful GNSS corrections, let alone to have access to an RTK network of multiple closely spaced reference stations. Furthermore, as the system state model is not coupled in the frequency domain, the dynamic system state model is easily extendable to include newly available GNSS frequency signals (e.g. the GPS L5 signal).

The state equations for the pseudo range system observations in this embodiment should minimally comprise as state variables, the satellite-single-differenced floating value code-code system hardware delays. Similarly, the state equations for the carrier phase system observations in this embodiment should minimally comprise as state variables, the satellite-single-differenced floating value code-phase system hardware delays. Although the expressions for the dynamic system state model defined in the claims reflect a preferred selection for forming a sufficient set of state variables, some variations in the definition and/or composition of the remaining state variables (i.e. the system tropospheric delays, the code system clock biases, the phase system clock biases, and satellite-single-differenced system ionospheric corrections) may be conceived.

Apart from this, it may be assumed that any or all of the reference stations in the GNS signal correction system have known fixed positions with respect to the earth's surface. Furthermore, it may be assumed that the GNSS satellite positions and satellite clock corrections are also known, e.g. from the satellite signal data, with precise corrections from the correction network. Inserting these known positions in the dynamic state model allows the GNS signal correction system to focus on dynamic estimation of only the remaining error contributions to the pseudo range and carrier phase system observations.

According to an embodiment, the mixed code-and-phase system hardware delays are defined as given in the claims.

In this form, the mixed code-and-phase system hardware delays follow from a simple linear combination of an original satellite-single-differenced phase system hardware delay and an original satellite-single-differenced code system hardware delay.

According to a method embodiment, the GNS signal correction system comprises a further reference station, and the method comprises: —dynamically estimating satellite-single-differenced mixed code-and-phase system hardware delays for the reference station and the further reference station; —assuming satellites-and-stations-double-differenced hardware delays, defined via $d_{\varphi_1,p_1,b}^{s,ref}(t)-d_{\varphi_1,p_1,a}^{s,ref}(t)=\lambda_i N_{i,a,b}^{s,ref}$, to have an integer value $N_{i,a,b}^{s,ref} \in \mathbb{N}$, and —dynamically fixing the satellites-and-stations-double-differenced hardware delays to an integer value.

It is emphasised that the method according to the present invention is believed to be unique in that it permits accurate positioning and fast convergence with a single reference station even when the distance between the mobile and reference station is large (1000 km). Nevertheless, the accuracy of the dynamic estimations may be improved if the GNS signal correction system involves two or more reference stations. Designating one of the reference stations in the system as the main reference station allows expressing the dynamic system state model in satellite-single-differenced (floating valued) mixed code-and-phase hardware delays for the main reference station, supplemented by satellites-and-stations-double-differenced (integer valued) hardware delays between the main reference station and each of the further reference stations. The latter hardware delays should theoretically be integer. In this embodiment, the improvement results from posing this extra integer value constraint. The result of a first estimation step is a set of real-valued hardware delays and a corresponding system covariance matrix. The ambiguities and matrix entries may then be used as input for a LAMBDA method, which finds the statistically favoured set of integer ambiguities. After applying the found most likely integer values, the estimation results of the system state model will become more accurate. The resulting single set of mixed code-and-phase system hardware delays may be transmitted to the mobile in real time via the system signal transmitter. The uncoupled mathematical structure for the dynamic system state model according to this embodiment still allows easy extension to include more reference stations and/or signal frequencies, and/or even other GNS systems.

An alternative method for calculating GNSS corrections for transmission to a mobile uses a GNS signal correction system comprising a reference station and an additional reference station. In this case, the GNS signal correction system may perform the above described method separately for the reference station and for the additional reference station. The respective mixed code-and-phase system hardware delays are thereafter transmitted to the mobile in real time as separate sets of correction data, allowing for a multi-baseline solution. It will be understood that at least one of the separate sets of correction data may be provided from a reference station and one or more further reference stations as described in the previous paragraph.

According to a further advantageous embodiment, the method may further comprise applying a weighting to the separate sets of correction data at the mobile. Various weighting considerations may be applied depending upon the expected accuracy of the respective sets of data. Most preferably, the weighting will be at least partially based on a distance between the mobile and the respective reference station.

Such a method may be applicable to the case that the reference station and the additional reference station are relatively close together, in particular when they are relatively closer together than they are to the mobile. More importantly, the method may be applicable when the reference stations are relatively more distant from each other than they are to the mobile. In particular, the method may provide accurate and fast results even when the reference station acquires GNSS data from a first set of satellites and the additional reference station acquires GNSS data from a second set of satellites at least partially different from the first set.

According to an embodiment, the method comprises: —dynamically estimating system ionospheric corrections simultaneously with the mixed code-and-phase system hardware delays, and —transmitting the system ionospheric corrections to the mobile via the system signal transmitter.

The ionospheric corrections that are dynamically estimated by the system control centre (SCC) may also be transmitted to the mobile if desired. In particular, if the mobile is close to the SCC, then the estimated atmospheric corrections are representative for the mobile position, and may be used by the mobile to improve the accuracy and/or convergence speed of its position determination. Ionospheric corrections are estimated separately for each satellite. If reference stations are close to each other, then the ionospheric corrections are assumed to have the same value for each reference station, although these values are different for each satellite. It is once again emphasised here that the present system and method do not rely on the presence of such ionospheric and tropospheric corrections, and can achieve accurate convergence over significant distances without these corrections.

According to a further embodiment, the method comprises —dynamically estimating tropospheric corrections simultaneously with the mixed code-and-phase hardware delays via the dynamic system state model, and —transmitting the tropospheric correction to the mobile via the system signal transmitter.

The tropospheric corrections may be estimated as a zenith delay, which is the same for each satellite. For an arbitrary satellite elevation, the zenith delay is mapped to that elevation using an appropriate mapping function, which can be taken approximately inversely proportional to the sine function having the elevation as an argument.

According to a further embodiment of this method, the system ionospheric corrections are defined by $I_r^{s,ref}(t)=I_r^s(t)-I_r^{ref}(t)+d_{p_1,r}^{s,ref}(t)$, wherein $I_r^s(t)-I_r^{ref}(t)$ are satellite-single-differenced ionospheric corrections, and $d_{p_1,r}^{s,ref}$ are satellite-single-differenced code system hardware delays.

In any of the embodiments described above, at least one of the satellite-single-differenced mixed code-and-phase system hardware delays, the system ionospheric corrections, and the system tropospheric corrections, and the satellites-and-stations-double-differenced hardware delays, may be dynamically estimated by means of a least squares or Kalman filter based dynamic system state model.

According to a second aspect, and complementary to the GNSS corrections calculation method described herein above with reference to the first aspect, there is provided a method for determining a mobile earth position, comprising: —providing the mobile comprising a mobile GNSS receiver at the mobile earth position; —acquiring GNSS data comprising pseudo range mobile observations and carrier phase mobile observations from a plurality of GNSS satellites transmitted over multiple epochs; —receiving GNSS corrections from a GNS signal correction system in real time, the GNSS corrections comprising satellite-single-differenced mixed code-and-phase system hardware delays dynamically estimated by a method according to any one of the claims; —applying the mixed code-and-phase system hardware delays to a dynamic mobile state model having the pseudo range mobile observations and carrier phase mobile observations as measurements, and —dynamically estimating the mobile earth position via the dynamic mobile state model.

The proposed mobile position determination method according to this aspect may be on the surface of the earth or close to it (e.g. in an aircraft), and is configured for deriving its position with respect to the earth on the basis of its own pseudo range and carrier phase observations, which form input for the dynamic mobile state model. This mobile state model is also provided with the GNSS corrections received from the SCC. The mobile may exploit the mixed code-and-phase system hardware delays from the SCC as an extra source of information for improving convergence time and/or accuracy of its own estimations.

According to an embodiment of the mobile position determination method, the dynamic mobile state model is defined as given in the claims.

The dynamic mobile state model in this method embodiment is structured mathematically identical to the dynamic system state model in a GNSS correction calculation method as described herein above. Hence, the software components (e.g. classes, numerical functions, error handling, etc.) can be designed to be interchangeable between software implementations for the mobile position determination method and software implementations for the GNSS correction calculation method. Alternatively, a single software system may be designed comprising all classes and interactions required for processing with either one of the dynamic system state model and the dynamic mobile state model. Such a software system can be run by either the GNS signal correction system processing unit, or the mobile processing unit, and its functionality can thus easily be adapted to the processing requirements.

The state equations for the pseudo range mobile observations in this embodiment should minimally comprise as state variables: the mobile receiver co-ordinates, as well as the satellite-single-differenced floating value code-code mobile hardware delays. Similarly, the state equations for the carrier phase mobile observations in this embodiment should minimally comprise as state variables: the mobile receiver co-ordinates, as well as the satellite-single-differenced floating value code-phase mobile hardware delays. Although the expressions for the dynamic mobile state model defined in the claims reflect a preferred selection for forming a sufficient set of mobile state variables, some variations in the definition and/or composition of the remaining state variables (i.e. the mobile tropospheric delays, the code mobile clock biases, the phase mobile clock biases, and satellite-single-differenced mobile ionospheric corrections) may be conceived.

According to an embodiment, the mixed code-and-phase mobile hardware delays are defined by $d_{\phi_i,p_1,m}^{s,ref}(t)=d_{\phi_i,m}^{s,ref}(t)+\gamma_i d_{p_1,m}^{s,ref}(t)$, wherein $d_{\phi_i,m}^{s,ref}$ are satellite-single- differenced phase mobile hardware delays, and $d_{p_i,m}^{s,ref}$ (are satellite-single-differenced code mobile hardware delays.

According to an embodiment, the method comprises: —assuming satellites-and-system-mobile double-differenced hardware delays, defined via $d_{\phi_i,p_1,m}^{s,ref}(t)-d_{\phi_i,p_1,r}^{s,ref}(t)=\lambda_i N_{i,m,r}^{s,ref}$, to have an integer value $N_{i,m,r}^{s,ref} \in \mathbb{N}$, and —dynamically fixing the satellites-and-system-mobile-double-differenced hardware delays to an integer value.

By application of the mixed code-and-phase system hardware delays from the SCC to the dynamic mobile state model, the satellites-and-system-mobile-double-differenced hardware delays should theoretically become integer. However, it is not possible to estimate integer parameters directly. The result of a first estimation step is a set of real-valued hardware delays and their covariance matrix. These floating values may be used as input by a LAMBDA method, which then finds the statistically favoured set of integer ambiguities, thereby increasing the amount of information available to the dynamic mobile state model for estimating the state parameters.

In yet a further method embodiment, after the satellites-and-system-mobile-double-differenced hardware delays have been dynamically fixed to an integer value, the carrier phase mobile observations in the dynamic system state model are defined by:

$$\phi_{i,m}^s(t)-\lambda_i N_{i,m,r}^{s,ref}=R_m^s(t)+T_m^s(t)+b_{\phi_i,m}^{ref}(t)+d_{\phi_i,p_1,r}^{s,ref}(t)-\gamma_i I_m^{s,ref}(t)$$

After fixing the most likely integer values for the satellites-and-system-mobile-double-differenced hardware delays, the dynamic mobile state model is adapted to include these fixed integer values, so that the number of estimation parameters decreases and mobile position estimation results become more accurate.

According to an embodiment, the method comprises: —receiving from the GNS signal correction system ionospheric corrections estimated by a method according to the claims; —obtaining weighted system ionospheric corrections, based on a calculated distance between the mobile earth position and the station earth position, and —applying the weighted system ionospheric corrections to the dynamic mobile state model, to improve the accuracy and/or convergence time of dynamic estimation of the mobile earth position.

The contribution of the ionosphere to the error accumulation in the GNSS data observations is generally considered to be highly variable as a function of earth position. By weighting the ionospheric corrections received from the system control centre, the mobile may vary the credibility and importance of the estimated ionospheric corrections as a function of its distance to the GNS signal correction system. Weighting may for example be achieved by using distance dependent coefficients in a covariance matrix that is dynamically updated by the mobile at each estimation step. If the mobile is far away, e.g. over 100 km, then the values for the ionospheric parameters estimated by the GNS signal correction system are not considered to reflect the actual local ionospheric error contribution at the mobile site. In this situation, the weighting step effectively excludes the ionospheric correction from the dynamic mobile state model calculations. On the contrary, if the mobile approaches the reference station, then the ionospheric corrections from the GNS signal correction system are assumed better to reflect the error contribution at the mobile position. So when the mobile closely approaches the system control centre, the weight of the reliable ionospheric corrections is increased, and the mobile is able to temporarily obtain more measurement information assisting in shortening the convergence time e.g. by faster fixing of the hardware delays to integer values. Even if the mobile subsequently moves away from the system control centre, then the acquired lock-in to the correct integer values for the satellites-and-system-mobile-double-differenced hardware delays may be retained.

According to a third aspect, and in accordance with the effects described herein above, there is provided a GNS signal correction system for estimating and transmitting GNSS corrections to a mobile, the GNS signal correction system comprising: —a reference station comprising: —a system GNSS receiver for acquiring GNSS data comprising pseudo range system observations and carrier phase system observations from a plurality of GNSS satellites transmitted over multiple epochs; —a system control centre, configured for receiving the GNSS data from the reference station in real time, and comprising: —a system processor unit configured for applying the GNSS data to a dynamic system state model having the pseudo range system observations and carrier phase system observations as measurements; —a system signal transmitter for transmitting signals to the mobile; characterized in that the system processor unit is configured for dynamically estimating the GNSS corrections comprising satellite-single-differenced mixed code-and-phase system hardware delays for distinct carrier phase observations and carrier frequencies, via the method embodiments described herein above with reference to the first aspect; and in that the system control centre is configured for transmitting the mixed code-and-phase hardware delays in real time.

According to an embodiment, the GNS signal correction system comprises only a single reference station.

According to another embodiment, the GNS signal correction system comprises a further reference station, wherein the system control centre is configured —for dynamically estimating the satellite-single-differenced mixed code-and-phase system hardware delays for the reference station and the further reference station, and —for dynamically fixing satellites-and-stations-double-differenced hardware delays to an integer value according to the method of the claims.

The system control centre may be located remotely from any one of the reference stations.

According to an embodiment, the system control centre is configured for separately dynamically estimating system ionospheric corrections, and for transmitting the system ionospheric corrections to the mobile via the system signal transmitter.

According to a fourth aspect, and in accordance with the effects described herein above, there is provided a mobile for co-operating with the GNS signal correction system, comprising —a mobile GNSS receiver for acquiring GNSS data comprising pseudo range mobile observations and carrier phase mobile observations from the plurality of GNSS satellites transmitted over multiple epochs, —a mobile signal receiver for receiving GNSS corrections from the system control centre. The GNSS corrections comprise satellite-single-differenced mixed code-and-phase system hardware delays, and the mobile comprises a mobile processing unit configured for applying the mixed code-and-phase system hardware delays to a dynamic mobile state model having the pseudo range mobile observations and carrier phase mobile observations as measurements, and for deriving a mobile earth position using any of the method embodiments according to the second aspect.

According to an embodiment, in addition to receiving the GNSS corrections from the SCC, the mobile processing unit is configured for receiving from geostationary satellites or internet links (which are not necessarily part of the GNS correction system) the satellite clock and orbit correction parameters and any other corrections such as ionospheric and tropospheric corrections, and for applying the received satellite clock and orbit correction parameters to the dynamic mobile state model. It is thus understood that these parameters may come from a different source or from the same source as the GNSS corrections.

According to a further embodiment, the mobile is arranged for receiving the system ionospheric corrections from the GNS signal correction system, wherein the mobile processing unit is configured for weighting the system ionospheric corrections based on a calculated distance between the reference station earth position and the mobile earth position, and for applying a weighted ionospheric corrections to the dynamic mobile state model, so as to improve an accuracy and/or a convergence time for dynamic estimation of the mobile earth position.

According to an embodiment, the mobile comprises a user interface that is configured for adjusting at least one mobile covariance matrix value of the dynamic mobile state model, so as to improve a dynamic estimation accuracy of a vertical component of the mobile earth position.

This user interface may take any suitable form, e.g. a simple switch, or a numerical input to actually provide the desired covariance matrix values in the dynamic mobile state model. Via the user interface, the user can at any time adjust the dynamic mobile state model settings for the mobile, e.g. by just flipping the switch to let the system change to a different set of preselected covariance values, or by manually entering such changes. By adjusting the state model settings, the estimation accuracy of e.g. the vertical component of the mobile earth position may be improved. This improvement may be accompanied by a reduced accuracy of the horizontal estimation results, but this is of minor importance if the user is only interested in vertical positional changes of the mobile, e.g. when the mobile is subjected to tremors or tide motions.

According to a fifth aspect, there is provided a computer program product configured to provide instructions to carry out a method according to the fourth aspect, or a method according to the fifth aspect, when loaded on a computer arrangement.

According to a sixth aspect, there is provided a computer readable medium, comprising a computer program product according to the fifth aspect of the invention.

According to a further aspect, and in accordance with the effects described herein above, there is provided a GNS signal correction system-and-mobile-receiver combination, comprising a GNS signal correction system according to the first aspect, and a mobile according to the second aspect of the invention.

BRIEF DESCRIPTION OF THE DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Figure 1:
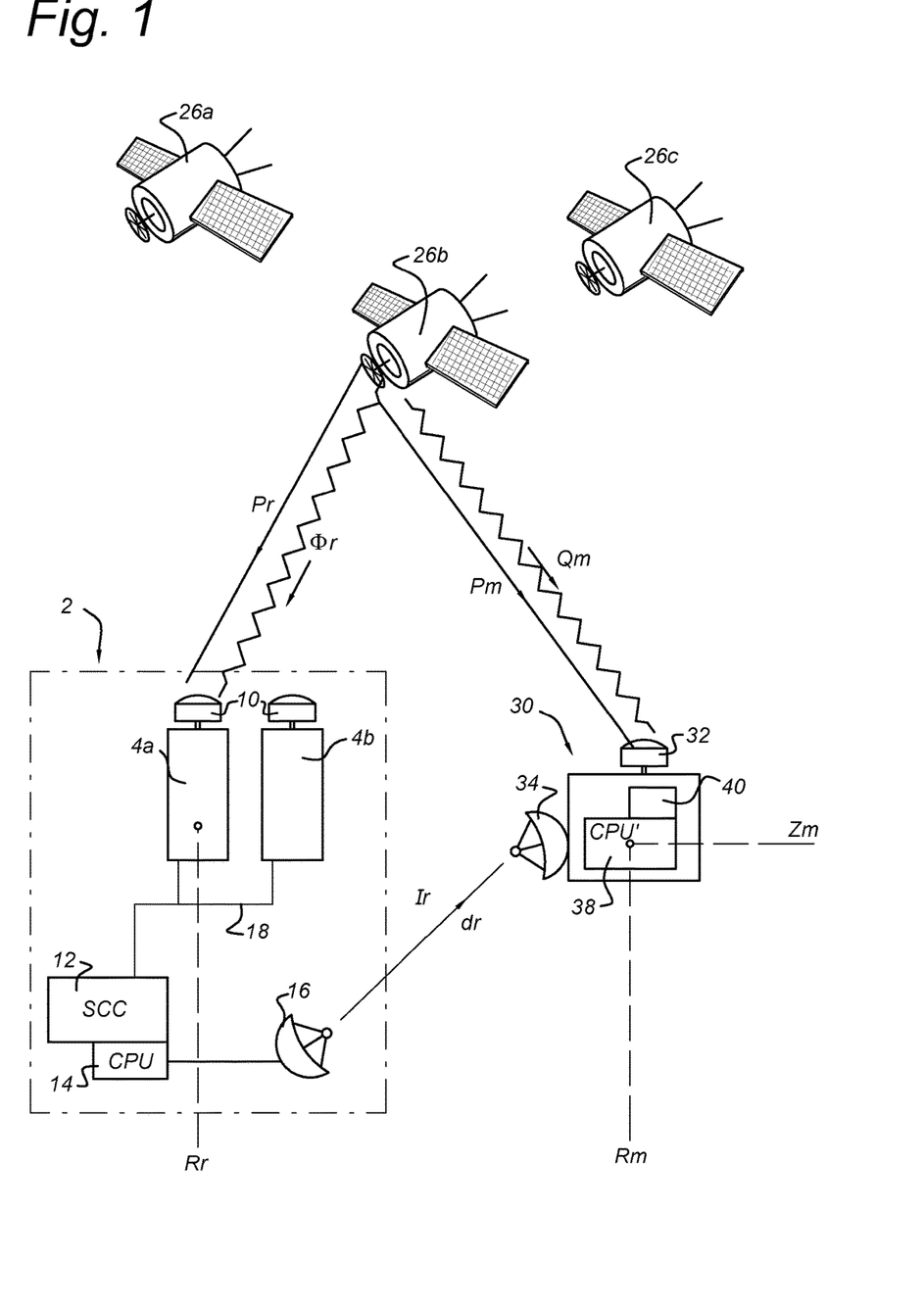
FIG. 1 schematically shows an embodiment of a GNS signal correction system and a mobile according to the invention.

Several approaches to PPP or Precise Point Positioning Real Time Kinematic (PPP RTK) exist, which methods can be employed for precise real-time GNSS positioning services. Integer ambiguity resolution (IAR) is a key technique for such services, and required for obtaining fast and accurate solutions. Herein below, embodiments of a PPP RTK-method with IAR for improving precision and/or reducing convergence time of precise real-time GNSS positioning services are elucidated. As illustrated by FIG. 1, the proposed approach uses a GNS signal correction system 2 comprising one or several reference stations 4a, 4b to continuously compute floating value hardware delays in the satellite carrier state equations from GNSS signals received from a plurality of GNSS satellites 26a-c. Once computed, these delays may be applied to data from any mobile or rover 30 located over 1000 km away from the network, in order to resolve ambiguities in PPP mode. This will not only result in faster convergence (10-15 minutes), but also in a more precise solution. The proposed PPP RTK based GNSS correction method and mobile 30 positioning method exploit pseudo range system observations Pr and carrier phase system observations Φr acquired by the reference stations 4a, 4b, and pseudo range mobile observations Pm and carrier phase mobile observations Φm acquired by the mobile 30 respectively. In addition to carrier phase ambiguity corrections, also ionospheric and tropospheric corrections may be estimated. It will be shown that the proposed method allows just a single main reference station 4a, to estimate the parameters of interest.

In general, a real-time service based on the proposed PPP RTK method requires:
  GNSS signals from the plurality of GNSS satellites 26a-c;
  the GNS signal correction system 2, comprising:
    one reference station 4a or several reference stations 4a, 4b for receiving the GNSS satellite signals;
    a system control centre (SCC) 12 for collecting reference station data, for processing reference station data to generate GNSS corrections, for encoding corrections, and for distributing encoded corrections to mobile users;
    real-time data links 18 between the at least one reference station 4a, 4b and the SCC 12, and
  The mobile or rover 30 configured with software for real-time processing of GNSS receiver data and PPP RTK based GNSS corrections.

PPP Measurement Model

The following dynamic state model for pseudo range system observations $Pr=\{p_{r,i}^s(t)\}$ and carrier phase system observations $\Phi r=\{\phi_{i,r}^s(t)\}$ (both in meters), acquired at reference station $r=4a, 4b, \ldots$ with respect to GNSS satellite $s=26a, 26b, n$ at carrier frequency $i=1, 2, \ldots, f$ and at time t, is known in the art:

$$p_{r,i}^s(t) = R_r^s(t) + c\delta t_r(t) - c\delta t^s(t) + \qquad (1)$$
$$T_r^s(t) + \gamma_i I_r^s(t) +$$
$$m_{p_i,r}^s(t) +$$
$$d_{p_i,r} - d_{p_i}^s$$

$$\phi_{i,r}^s(t) = R_r^s(t) + c\delta t_r(t) - c\delta t^s(t) +$$
$$T_r^s(t) - \gamma_i I_r^s(t) +$$
$$m_{\phi_i,r}^s(t) +$$
$$d_{\phi_i,r} - d_{\phi_i}^s +$$
$$\lambda_i N_{i,r}^s + \varphi_{i,r} - \varphi_i^s$$

Here, $R_r^s(t)$ is the actual distance $\|R_r(t) - R^s(t)\|$ between the known station position Rr of reference station r and the position of satellite s, c is the speed of light, $\delta t_r$ and $\delta t^s$ are receiver clock biases and satellite clock biases, $T_r^s(t)$ are tropospheric delays, $\gamma_i = \lambda_i^2/\lambda_1^2$ with $\lambda_i$ the carrier wavelength for frequency i, $I_r^s(t)$ are ionospheric corrections, $d_{p_i,r}, d_{p_i}^s, d_{\phi_i,r}, d_{\phi_i}^s$ are hardware delays (which may be assumed constant during a satellite orbital pass of several hours), $N_{i,r}^s$ are integer valued carrier phase ambiguities, and $\varphi_{i,r}, \varphi_i^s$ are initial carrier ambiguities (which are generally not integer). From now on, the multipath effects m given in eq. (1) will be ignored. It is not possible to solve for all parameters in eq. (1), so a reparameterization is performed.

Below, a proposed reparameterization of eq. (1) is elucidated, which yields satellite-single-differenced mixed code-and-phase system hardware delays $dr = d_{\phi_i, p_1, r}^{s, ref}(t)$. It is assumed that the major part of the satellite clock bias $\delta t^s$ can be removed, e.g. by using parameters transmitted by the satellites 26a-c in their navigation message, or other more precise parameters determined in (near) real-time, and that only a slowly changing residual part $\epsilon^s(t)$ remains. Since the satellite orbits are not perfect either, a slowly changing scalar residual orbit bias $v_r^s(t)$ mapped along the line of sight is substituted as well. Ignoring multipath, the various elements of eq. (1) may then be described as follows:

Code system clock biases $b_{p_i,r}^{ref}(t)$:

$$b_{p_i,r}^{ref}(t) = c\delta t_r(t) + d_{p_i,r} - d_{p_i}^{ref} - \qquad (2)$$
$$\epsilon^{ref}(t) + v_r^{ref}(t) +$$
$$\gamma_i I_r^{ref}(t) \quad i = 1, \ldots, f$$

Code-code system hardware delays $d_{p_i, p_1, r}^{s, ref}(t)$:
First define parameter $d_{p_i, r}^{s, ref}$ as $$d_{p_i, r}^{s, ref}(t) = -d_{p_i}^s + d_{p_i}^{ref} - \qquad (3)$$
$$\epsilon^s(t) + \epsilon^{ref}(t) +$$
$$v_r^s(t) - v_r^{ref}(t)$$
$$i = 1, \ldots, f \ s = 1, \ldots, n \ s \neq ref$$

The code-code system hardware delays are then defined as $$d_{p_i, p_1, r}^{s, ref}(t) = d_{p_i, r}^{s, ref}(t) - \frac{\gamma_i}{\gamma_1} d_{p_1, r}^{s, ref}(t) \qquad (4)$$
$$i = 2, \ldots, f \ s = 1, \ldots, n \ s \neq ref$$

Carrier phase system clock biases $b_{\phi_i, r}^{ref}(t)$:

$$b_{\phi_i, r}^{ref} = c\delta t_r(t) + d_{\phi_i, r} - d_{\phi_i}^{ref} - \qquad (5)$$
$$\epsilon^{ref}(t) + v_r^{ref}(t) +$$
$$\lambda_i N_{i,r}^{ref} + \varphi_{i,r} - \varphi_i^{ref} -$$
$$\gamma_i I_r^{ref}(t) \quad i = 1, \ldots, f$$

Code and phase system hardware delays $dr = d_{\phi_i, p_1, r}^{s, ref}(t)$:
First define the parameter $d_{\phi_i, r}^{s, ref}(t)$ as $$d_{\phi_i,r}^{s,ref}(t) = -d_{\phi_i}^s + d_{\phi_i}^{ref} - \quad (6)$$

$$\epsilon^s(t) + \epsilon^{ref}(t) +$$

$$v_r^s(t) - v_r^{ref}(t) +$$

$$\lambda_i N_{i,r}^s - \varphi_i^s - \lambda_i N_{i,r}^{ref} + \varphi_i^{ref}$$

$$i = 1, \ldots, f \; s = 1, \ldots, n \; s \neq ref$$

Then, the satellite-single-differenced mixed code-and-phase system hardware delays dr are defined as $$d_{\phi_i,P_1,r}^{s,ref}(t) = d_{\phi_i,r}^{s,ref}(t) + \frac{\gamma_i}{\gamma_1} d_{P_1,r}^{s,ref}(t) \quad (7)$$

$$i = 1, \ldots, f \; s = 1, \ldots, n \; s \neq ref$$

The ionospheric effects in the pseudo range system observations Pr and the carrier phase system observations Φr are represented by a set of ionospheric correction parameters Ir={$I_r^{s,ref}(t)$} that are left to be estimated by the proposed GNSS correction calculation method (as opposed to being eliminated according to various known methods):

$$I_r^{s,ref}(t) = I_r^s(t) - I_r^{ref}(t) + d_{P_1,r}^{s,ref}(t)$$

$$S = 1, \ldots, n \; s \neq ref \quad (8)$$

The proposed reparameterization results in the following dynamic system state model 60:

$$p_{i,r}^s(t) = R_r^s(t) + T_r^s(t) + b_{P_i,r}^{ref}(t) + d_{P_i,P_1,r}^{s,ref}(t) + \gamma_i I_r^{s,ref}(t)$$

$$\phi_{i,r}^s(t) = R_r^s(t) + T_r^s(t) + b_{\phi_i,r}^{ref}(t) + d_{\phi_i,P_1,r}^{s,ref}(t) - \gamma_i I_r^{s,ref}(t) \quad (9)$$

By this transformation, the mathematical structure of both observation types becomes such that all parameters can be estimated. Note that $d_{P_1,P_1,r}^{ref,ref}(t)$ is zero. Also it may be assumed that both the reference station position Rr and the satellite position are known, e.g. from prior knowledge or other sources, so that the actual distance $R_r^s(t) = \|R_r(t) - R^s(t)\|$ between the known reference station position Rr and the satellite position is known, and does not have to be estimated.

As illustrated by FIG. 1 a GNSS correction system 2 is proposed for estimating and transmitting GNSS corrections to the mobile 30, based on the dynamic system state model 60 in eq. (9). In general, the proposed GNS signal correction system 2 comprises:
- at least one reference station 4a, 4b, which is provided with:
  - a system GNSS receiver 10 for acquiring GNSS data comprising pseudo range system observations Pr and carrier phase system observations Or from the GNSS satellites 26a-c transmitted over multiple epochs;
- the system control centre 12, which is configured for receiving the GNSS data from the at least one reference station in real time, and comprising:
  - a system processor unit 14 configured for applying the GNSS data to the dynamic system state model 60 having for distinct reference stations the pseudo range system observations Pr and carrier phase system observations Or as measurements;
  - a system signal transmitter 16 for transmitting the GNSS corrections to the mobile 30 in real time.

The system processor unit 14 is configured for dynamically estimating the GNSS corrections which comprise the satellite-single-differenced mixed code-and-phase system hardware delays dr={$d_{\phi_i,P_1,r}^{s,ref}(t)$} for distinct carrier phase system observations Φr and carrier frequencies i, via the dynamic system state model 60.

Additionally, the proposed GNSS correction method may comprise dynamically estimating the system ionospheric corrections Ir simultaneously with the mixed code-and-phase system hardware delays dr, and transmitting the system ionospheric corrections Ir to the mobile 30 via the system signal transmitter 16. In accordance with eq. (8), the system ionospheric corrections Ir in the GNSS correction method may be defined by $I_r^{s,ref}(t) = I_r^s(t) - I_r^{ref}(t) + d_{P_1,r}^{s,ref}(t)$ wherein $I_r^s(t) - I_r^{ref}(t)$ are satellite-single-differenced ionospheric corrections, and $d_{P_1,r}^{s,ref}$ are the satellite-single-differenced code system hardware delays. Furthermore, the tropospheric delays Tr={$T_r^s(t)$} may be approximated by $$T_r^s(t) = M_d(E(t))T_{d,z} + M_w(E(t))T_{w,z} + \quad (10)$$

$$M_\Delta(E(t))\{G_N \cos(A(t)) + G_E \sin(A(t))\}$$

where $T_{d,z}$ and $T_{w,z}$ are the dry (hydrostatic) and wet zenith delays, and A and E are the satellite's azimuth and elevation, $G_N$ and $G_E$ are the elements of a horizontal gradient vector and $M_d$, $M_w$ and $M_\Delta$ are mapping functions. Unknowns in this model are the zenith delays (or corrections to some a priori values) and the elements of the gradient vector. The elements of the gradient vector are generally small and may be ignored, leaving only the zenith delay. As the dry zenith delay is predictable or known, only the wet zenith delay remains to be estimated.

Correspondingly, the system control centre 12 in the GNS signal correction system 2 may be configured for separately dynamically estimating the system ionospheric corrections Ir and/or the system tropospheric corrections Tr, and for transmitting the system ionospheric corrections Ir and/or system tropospheric corrections Tr to the mobile 30 via the system signal transmitter 16.

Exemplary PPP RTK Method

Figure 2:
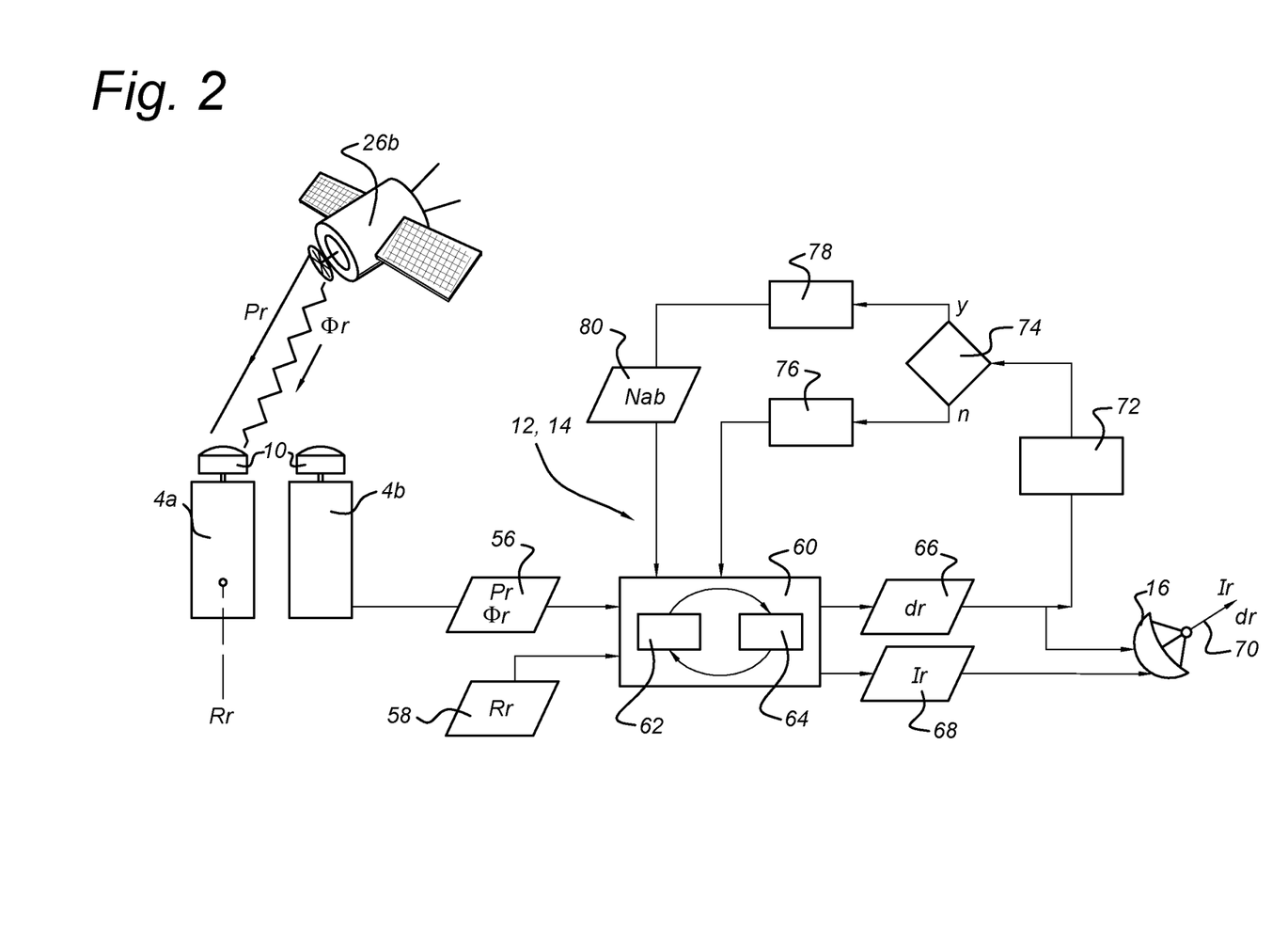
FIG. 2 shows a diagram for a GNS signal correction method according to an embodiment of the invention.

Below, and with reference to FIG. 2, specific examples of the general GNSS correction method and correction system 2 are presented, wherein (at least) two closely spaced reference stations 4a, 4b are present. Each of the reference stations 4a, 4b may acquire pseudo range system observations Pr and carrier phase system observations Or from a plurality of GNSS satellites 26a-26c (in FIG. 2, only satellite 26b is shown) transmitted over multiple epochs. The observations received by the reference stations 4a, 4b are supplied to the system control centre 12 that has a system processor unit 14 configured for dynamic system state model 60 processing, based on the pseudo range system observations Pr and carrier phase system observations Or as measurements. The dynamic system state model 60 may alternatingly execute system state predictions 62 and system state corrections 64, for example via implementation using Kalman filter techniques for which the basic principles are known in the art. The system state predictions 62 are time updates of the system state variables based on physical propagation models that are not further discussed herein. If the prediction periods are relatively short, then a simple identity matrix may be sufficient as transition matrix. The system state corrections 64 are measurement updates of the system state variables based on the latest measurement values for the observables. The system state model 60 allows dynamic estimations of the satellite-single-differenced mixed code-and-phase system hardware delays dr for distinct carrier phase observations (action 66).

In addition, the system control centre 12 may be configured for dynamically estimating system ionospheric corrections Ir (action 68), and for transmitting the system ionospheric corrections to the mobile 30 via the system signal transmitter 16 (action 70). Any of the actions described above as illustrated in FIG. 2 may be present in the general GNSS correction calculation method, involving only one reference station 4a or several reference stations 4a, 4b.

In the particular example with two reference stations 4a, 4b indexed by r=a, b, which are additionally assumed to be located close to each other, it follows that $$v_a^s = v_b^s = v^s$$

$$T_a^s = T_b^s = T^s$$

$$I_a^s = I_b^s = I^s$$

$$d_{p_i,a}^{s,ref} = d_{p_i,a}^{s,ref} = d_{p_i}^{s,ref}$$

$$d_{p_i,p_1,a}^{s,ref} = d_{p_i,p_1,b}^{s,ref} = d_{p_i,p_1}^{s,ref}$$

$$I_a^{s,ref} = I_b^{s,ref} = I^{s,ref} \quad (11)$$

This leads to the following simplified PPP dynamic system state equations 60:

$$p_{i,a}^s(t) = R_a^s(t) + T^s(t) + \gamma_i I^{s,ref}(t) + b_{p_i,a}^{ref}(t) + d_{p_i,p_1}^{s,ref}(t)$$

$$\phi_{i,a}^s(t) = R_a^s(t) + T^s(t) - \gamma_i I^{s,ref}(t) + b_{\phi_i,a}^{ref}(t) + d_{\phi_i,p_1,a}^{s,ref}(t)$$

$$p_{i,b}^s(t) = R_b^s(t) + T^s(t) + \gamma_i I^{s,ref}(t) + b_{p_i,b}^{ref}(t) + d_{p_i,p_1}^{s,ref}(t)$$

$$\phi_{i,b}^s(t) = R_b^s(t) + T^s(t) - \gamma_i I^{s,ref}(t) + b_{\phi_i,b}^{ref}(t) + d_{\phi_i,p_1,b}^{s,ref}(t) \quad (12)$$

The carrier phase system observable $\phi_{i,b}^s(t)$ for the further reference station 4b may be written as:

$$\phi_{i,b}^s(t) = R_b^s(t) + T^s(t) - \gamma_i I^{s,ref}(t) + b_{\phi_i,b}^{ref}(t) + \\ d_{\phi_i,p_1,a}^{s,ref}(t) + d_{\phi_i,p_1,b}^{s,ref}(t) - d_{\phi_i,p_1,a}^{s,ref}(t) \\ = R_b^s(t) + T^s(t) - \gamma_i I^{s,ref}(t) + b_{\phi_i,b}^{ref}(t) + d_{\phi_i,p_1,a}^{s,ref}(t) + d_{\phi_i,p_1,a,b}^{s,ref}(t) \\ = R_b^s(t) + T^s(t) - \gamma_i I^{s,ref}(t) + b_{\phi_i,b}^{ref}(t) + d_{\phi_i,p_1,a}^{s,ref}(t) + \lambda_i N_{i,a,b}^{s,ref} \quad (13)$$

where Nab=$\{N_{i,a,b}^{s,ref}\}$ are satellites-and-stations-double-differenced hardware delays (i.e. differences between four parameters associated with two distinct satellites and two distinct reference stations), defined between the main reference station 4a and the further reference station 4b. These hardware delays Nab theoretically should have integer values $N_{i,a,b}^{s,ref} \in \mathbb{N}$, pursuant to $d_{\phi_i,p_1,b}^{s,ref}(t) - d_{\phi_i,p_1,a}^{s,ref}(t) = \lambda_i N_{i,a,b}^{s,ref}$. The dynamic estimations based on the dynamic system state model 60 in this specific example are simplified, due to the reduced number of parameters that need to be estimated. In this embodiment, the improvement results from posing the integer constraint to the satellites-and-stations-double-differenced hardware delays Nab. The result of an initial estimation step is a set of real-valued mixed code-and-phase system hardware delays dr=$\{d_{\phi_i,p_1,b}^{s,ref}(t) - d_{\phi_i,p_1,a}^{s,ref}(t)\}$, and a corresponding system covariance matrix. The system hardware delays dr and covariance matrix entries may be used as input for a LAMBDA method (or other suitable most likely integer estimation method known by the skilled person), which may be used to find the statistically favoured set of integer hardware delays Nab (action 72). After any decision that the hardware delays have been successfully fixed to an integer value (action 78), the most likely integer values for Nab will be applied to the dynamic system state model 60 (action 80), and the estimation results of the dynamic system state model 60 will become more accurate. If integer fixing proves unsuccessful, then the dynamic system state model 60 will continue with floating value estimation of the system hardware delays dr (action 76) according to eq. (12).

Accordingly, in this exemplary embodiment, the GNS signal correction system 2 comprises the main reference station 4a and the further reference station 4b, and the system control centre 12 is configured —for dynamically estimating the satellite-single-differenced mixed code-and-phase system hardware delays dr for the reference station 4a and the further reference station 4b, and —for dynamically fixing satellites-and-stations-double-differenced hardware delays Nab to an integer value as described herein above.

Implementation options for the dynamic system state model 60 are now discussed. Again, the uncoupled mathematical structure for the dynamic system state model 60 according to this embodiment allows easy extension to include more reference stations and/or carrier frequencies fi, and/or even other GNS systems. Selecting the last satellite as reference satellite and omitting the time argument, the measurement model for one epoch of dual-frequency data is given by a dynamic system state matrix equation $$y = Ax \quad (14)$$

with y representing a vector of observed values minus computed values for both range and carrier phase, x representing a vector of the state parameters, and A representing a state-to-observations transformation matrix. In particular, we have $$y = \begin{pmatrix} (p_{1,a} - R_a)^T \begin{pmatrix} p_{2,a} - \\ R_a \end{pmatrix}^T (\phi_{1,a} - R_a)^T (\phi_{2,a} - R_a)^T \dots \\ \dots \begin{pmatrix} p_{1,b} - \\ R_b \end{pmatrix}^T (p_{2,b} - R_b)^T (\phi_{1,b} - R_b)^T (\phi_{2,b} - R_b)^T \end{pmatrix}^T$$

$$x = \begin{pmatrix} b_{p_1,a}^n & b_{p_2,a}^n & b_{\phi_1,a}^n & b_{\phi_2,a}^n & b_{\phi_1,b}^n & b_{p_2,b}^n & b_{\phi_1,b}^n & b_{\phi_2,b}^n & ZD \dots \\ \dots I^{n,T} & d_{p_2,p_1}^{n,T} & d_{\phi_1,p_1,a}^{n,T} & d_{\phi_2,p_1,a}^{n,T} & N_{1,a,b}^{n,T} & N_{2,a,b}^{n,T} \end{pmatrix}^T \quad (15)$$

-continued $$\begin{pmatrix} e_n & 0 & 0 & 0 & 0 & 0 & 0 & 0 & f_{n,a} & \gamma_1 E_{n\times(n-1)} & \ldots & \ldots & 0 & 0 & 0 & 0 & 0 \\ 0 & e_n & 0 & 0 & 0 & 0 & 0 & 0 & f_{n,a} & \gamma_2 E_{n\times(n-1)} & \ldots & \ldots & E_{n\times(n-1)} & 0 & 0 & 0 & 0 \\ 0 & 0 & e_n & 0 & 0 & 0 & 0 & 0 & f_{n,a} & -\gamma_1 E_{n\times(n-1)} & \ldots & \ldots & 0 & E_{n\times(n-1)} & 0 & 0 & 0 \\ 0 & 0 & 0 & e_n & 0 & 0 & 0 & 0 & f_{n,a} & -\gamma_2 E_{n\times(n-1)} & \ldots & \ldots & 0 & 0 & E_{n\times(n-1)} & 0 & 0 \\ 0 & 0 & 0 & 0 & e_n & 0 & 0 & 0 & f_{n,b} & \gamma_1 E_{n\times(n-1)} & \ldots & \ldots & 0 & 0 & 0 & 0 & 0 \\ 0 & 0 & 0 & 0 & 0 & e_n & 0 & 0 & f_{n,b} & \gamma_2 E_{n\times(n-1)} & \ldots & \ldots & E_{n\times(n-1)} & 0 & 0 & 0 & 0 \\ 0 & 0 & 0 & 0 & 0 & 0 & e_n & 0 & f_{n,b} & -\gamma_1 E_{n\times(n-1)} & \ldots & \ldots & 0 & E_{n\times(n-1)} & 0 & \lambda_1 E_{n\times(n-1)} & 0 \\ 0 & 0 & 0 & 0 & 0 & 0 & 0 & e_n & f_{n,b} & -\gamma_2 E_{n\times(n-1)} & \ldots & \ldots & 0 & 0 & E_{n\times(n-1)} & 0 & \lambda_2 E_{n\times(n-1)} \end{pmatrix} \quad (16)$$

wherein $$\begin{aligned} p_{i,j} &= (p_{i,j}^1 \ldots p_{i,j}^n)^T \\ \phi_{i,j} &= (\phi_{i,j}^1 \ldots \phi_{i,j}^n)^T \\ R_j &= (R_j^1 \ldots R_j^n)^T \\ e_n &= (1 \ldots 1)^T \\ l^n &= (l^{1,n} \ldots l^{n-1,n})^T \\ d_{p_2,p_1}^n &= (d_{p_i,p_1}^{1,n} \ldots d_{p_i,p_1}^{n-1,n})^T \\ d_{\phi_1,p_1,a}^n &= (d_{\phi_1,p_1,a}^{1,n} \ldots d_{\phi_1,p_1,a}^{n-1,n})^T \\ N_{i,a,b}^n &= (N_{i,a,b}^{1,a} \ldots N_{i,a,b}^{n-1,n})^T \end{aligned} \quad (17)$$

with i=1, 2 and j=a, b. Matrix $E_{n\times(n-1)}$ is given by $$E_{n\times(n-1)} = \begin{pmatrix} I_{n-1} \\ 0_{n-1}^T \end{pmatrix} = \begin{pmatrix} 1 & & \\ & \ddots & \\ & & 1 \\ 0 & \ldots & 0 \end{pmatrix} \quad (18)$$

Finally, vectors $f_{n,a}$ and $f_{n,b}$ contain the tropospheric mapping function values for each satellite. In general, it is assumed that $f_{n,a} \neq f_{n,b}$, but when the stations are close to each other, we get $f_{n,a} \approx f_{n,b} = f_n$. As a result, the design matrix A is no longer of full rank, and it is not possible to solve all parameters using one epoch of data. As mentioned above, the unknown tropospheric parameter consists of a tropospheric zenith delay ZD only, which changes slowly and smoothly with time and may therefore be modelled using a simple Kalman filter. When receiver-satellite geometry changes, so do the elements of $f_n$. As a result, for more than one epoch of data, it is possible to estimate all parameters. The receiver-satellite geometry is assumed to change only slowly with time, so in order for all parameters to be estimable, the time interval to be considered may have to be large, i.e., of the order of tens of seconds. Parameters that are to be used in this example as PPP RTK based GNSS corrections for transmission to a mobile 30 comprise $d_{\phi_i,p_1,r}^n$ and may also comprise $I^n$, $d_{p_2,p_1,r}^n$, and ZD. Use of the GNSS corrections by a mobile 30 in general is elucidated hereinafter.

Mobile

Figure 3:
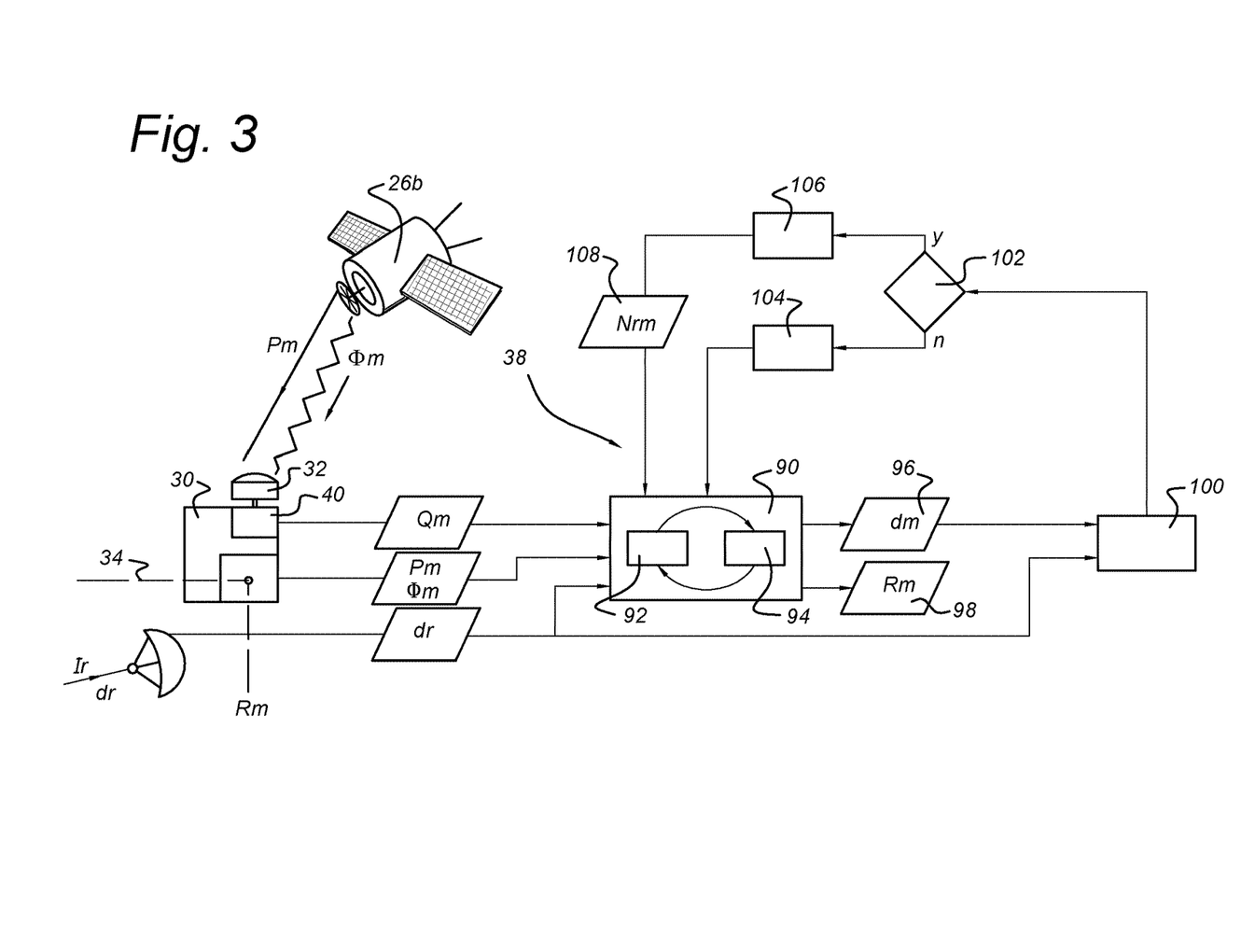
FIG. 3 shows a diagram for a mobile position determination method according to an embodiment of the invention.

Embodiments of a mobile 30 and a method for determining a mobile position Rm, which function complementary to the GNS signal correction systems 2 and GNSS correction calculation methods described herein above, are elucidated below with reference to FIG. 3. In general, the mobile 30 comprises: —a mobile GNSS receiver 32 for acquiring GNSS data comprising pseudo range mobile observations Pm and carrier phase mobile observations Φm from the plurality of GNSS satellites 26a-26c (in FIG. 3, only satellite 26b is shown) transmitted over multiple epochs, and —a mobile signal receiver 34 for receiving GNSS corrections from the system control centre 12 of the GNS signal correction system 2. The GNSS corrections received by the mobile 30 comprise the satellite-single-differenced mixed code-and-phase system hardware delays dr received from the GNS signal correction system 2, and the mobile 30 comprises a mobile processing unit 38 that is configured for applying the mixed code-and-phase system hardware delays dr to a dynamic mobile state model 90 having the pseudo range mobile observations Pm and carrier phase mobile observations Φm as measurements, and for deriving a mobile earth position Rm using the GNSS correction method.

For the proposed position determination method in general, the dynamic mobile state model 90 is defined by:

$$\begin{aligned} p_{i,m}^s(t) &= R_m^s(t) + T_m^s(t) + b_{p_i,m}^{ref}(t) + d_{p_i,p_1,m}^{s,ref}(t) + \gamma_i I_m^{s,ref}(t) \\ \phi_{i,m}^s(t) &- d_{\phi_i,p_1,r}^{s,ref}(t) = R_m^s(t) + T_m^s(t) + b_{\phi_i,m}^{ref}(t) + d_{\phi_i,p_1,m}^{s,ref}(t) - d_{\phi_i,p_1,r}^{s,ref}(t) - \gamma_i I_m^{s,ref}(t) \end{aligned} \quad (19)$$

wherein s is a satellite index, m is a mobile index, i is a carrier frequency index, $p_{i,m}^s(t)$ are the pseudo range mobile observations Pm, $\phi_{i,m}^s(t)$ are the carrier phase mobile observations Φm, $R_m^s(t)$ are distances $\|R_m(t)-R^s(t)\|$ the mobile earth position Rm and a GNSS satellite position, $T_m^s(t)$ are mobile tropospheric delays, $b_{p_i,m}^{ref}(t)$ and $b_{\phi_i,m}^{ref}(t)$ are code mobile clock biases and phase mobile clock biases respectively, $d_{p_i,p_1,m}^{s,ref}(t)$ are satellite-single-differenced (floating value) code-code mobile hardware delays, $d_{\phi_i,p_1,m}^{s,ref}(t)$ are the satellite-single-differenced (floating value) mixed code-and-phase mobile hardware delays dm, $d_{\phi_i,p_1,r}^{s,ref}(t)$ are the received satellite-single-differenced (floating value) mixed code-and-phase system hardware delays dr, $I_m^{s,ref}(t)$ are satellite-single-differenced mobile ionospheric corrections Im, and $\gamma_i = \lambda_i^2/\lambda_1^2$, with $\lambda_i$ a carrier wavelength for the corresponding carrier frequency $f_i$.

From inspection of eq. (19), it appears that the system hardware delays dr generated by the NCC are initially applied to the dynamic mobile state model 90 with no net effect, and that the dynamic mobile state model 90 comprises state equations that are mathematically similar to those in eq. (9). The mobile processor unit 38 is configured for dynamic mobile state model 90 processing based on these mobile observations Pm, Φm as measurements, wherein numeric values for mobile position Rm, receiver clock biases, mobile tropospheric and ionospheric corrections Tm, Im, and hardware delays, given in eq. (19), are dynamically estimated (actions 92 and 94). Processing with the dynamic mobile state model 90 may alternatingly yield mobile state predictions 92 (i.e. time updates of the mobile state variables based on any known physical propagation model, not further discussed here) and mobile state corrections 94 (i.e. measurement updates of the mobile state variables based on the latest measurement values for the observables), e.g. via implementation based on a Kalman filter. Processing with the mobile state model 90 yields dynamic estimations of the satellite-single-differenced mixed code-and-phase mobile hardware delays dm for distinct carrier phase mobile observations (action 96), and dynamic estimations of the mobile position Rm (action 98). The estimated mobile hardware delays dm are combined with the received system hardware delays dr for achieving beneficial effects explained below.

In general, a "baseline parameter" is defined as a single difference between two simultaneous parameters of a same quantity x at remote locations. Denoting the stations at both ends of the baseline b by r (e.g. reference station 4a) and m (e.g. mobile 30), we obtain for an arbitrary baseline parameter $x_b(t)$ measured at time t:

$$x_b(t) = x_m(t) - x_r(t) \tag{20}$$

In general, the measurement times for observations at the mobile differ from those for observations at the reference station. Eq. (20) may be generalized for different measurement times $t_r \neq t_m$ $$x_b(t_m, t_r) = x_m(t_m) - x_r(t_r) \tag{21}$$

For small time differences $t_m - t_r$, one may write $$\begin{aligned} x_i(t_m, t_r) &= x_m(t_m) - x_r(t_r) \tag{22} \\ &= x_m(t_m) - x_r(t_m + t_r - t_m) \\ &\approx x_m(t_m) - x_r(t_m) - \frac{dx_r}{dt}\bigg|_{t_m}(t_r - t_m) \\ &= x_b(t_m) - \frac{dx_r}{dt}\bigg|_{t_m}(t_r - t_m) \end{aligned}$$

For negligible time differences, only the first term in this approximation should suffice. In particular for the mixed code-and-phase system or mobile hardware delays dr, dm, one obtains the following baseline hardware delays $$d_{\phi_i,p_1,b}^{s,ref}(t) = d_{\phi_i,p_1,m}^{s,ref}(t) - d_{\phi_i,p_1,r}^{s,ref}(t) \tag{23}$$

If multipath and orbital biases are absent, then the baseline hardware delays reduce to $$d_{\phi_i,p_1,m}^{s,ref}(t) - d_{\phi_i,p_1,r}^{s,ref}(t) = \lambda_i N_{i,m,r}^{s,ref} \tag{24}$$

Here Nrm=$\{N_{i,m,r}^{s,ref}\}$ are satellites-and-system-mobile-double-differenced hardware delays. The hardware delays Nrm may be exploited for parameter reduction in the proposed PPP RTK based mobile position determination method.

The result of an initial dynamic estimation step using the dynamic mobile state model 90 is a set of real-valued mixed code-and-phase hardware delays $d_{\phi_i,p_1,m}^{s,ref}(t) - d_{\phi_i,p_1,r}^{s,ref}(t)$, which in theory should be an integer number of cycles Nrm, multiplied by a carrier wavelength, see above, and a corresponding system covariance matrix. These hardware delays and their corresponding covariance matrix entries may be used as input for a LAMBDA method (or other suitable most likely integer estimation method known by the skilled person), which may be used to find a statistically favoured set of integer values for the hardware delays Nrm (action 100). After a decision that the hardware delays have been successfully fixed to an integer value (action 106), the most likely integer values for the hardware delays Nrm will be applied to the dynamic mobile state model 90 (action 108), and the estimation results of the dynamic mobile state model 90 will become more accurate. After successful fixing of the satellites-and-system-mobile-double-differenced hardware delays Nrm to an integer value (action 106), the hardware delays Nrm are applied (action 108) by letting the state equation for the carrier phase mobile observation Φm assume the form:

$$\begin{aligned} \Phi_{i,m}^s(t) - d_{\phi_i,p_1,r}^{s,ref}(t) - \lambda_i N_{i,m,r}^{s,ref} = R_m^s(t) + \\ T_m^s(t) + b_{\phi_i,m}^{ref}(t) - \gamma_i I_m^{s,ref}(t) \end{aligned} \tag{25}$$

The dynamic estimations based on this dynamic mobile state model 90 are thereby simplified, due to the reduced number of parameters that need to be estimated. If integer fixing proved unsuccessful, then the dynamic mobile state model 90 will continue with floating value estimation of the mobile hardware delays Nrm (action 104) according to eq. (19).

Correspondingly, the mobile position estimation method comprises: —assuming satellites-and-system-mobile double differenced hardware delays Nrm to have an integer value $N_{i,m,r}^{s,ref} \in \mathbb{N}$, pursuant to $d_{\phi_i,p_i,m}^{s,ref}(t) - d_{\phi_i,p_1,r}^{s,ref}(t) = \lambda_i N_{i,m,r}^{s,ref}$ and —dynamically fixing the satellites-and-system-mobile-double-differenced hardware delays to an integer value.

In addition, the mobile 30 may be arranged for receiving and exploiting the system ionospheric corrections Ir from the GNS signal correction system 2. As ionospheric correction differences may be assumed negligible for relatively short baselines, the system ionospheric correction Ir may be received and directly inserted into the dynamic mobile state model 90 for quicker convergence of the remaining parameters, if the mobile 30 is relatively close to the reference station 4a. More generally, the mobile 30 may be arranged for receiving and exploiting the system ionospheric corrections Ir, even at larger distances. The mobile processing unit 38 may for example be configured for weighting the system ionospheric corrections Ir based on a calculated distance between the reference station earth position Rr and the mobile earth position Rm, and for applying weighted ionospheric corrections Iw to the dynamic mobile state model 90, so as to improve an accuracy and/or a convergence time for dynamic estimation of the mobile earth position Rm. Here, the weight for the system ionospheric correction will decrease with increasing distance between the mobile 30 and the reference station 4a.

Furthermore, the mobile 30 may comprise a user interface 40 that is configured for adjusting at least one mobile covariance matrix value Qm for the dynamic mobile state model 90, so as to improve a dynamic estimation accuracy of a vertical component Zm of the mobile earth position Rm.

Figure 4:
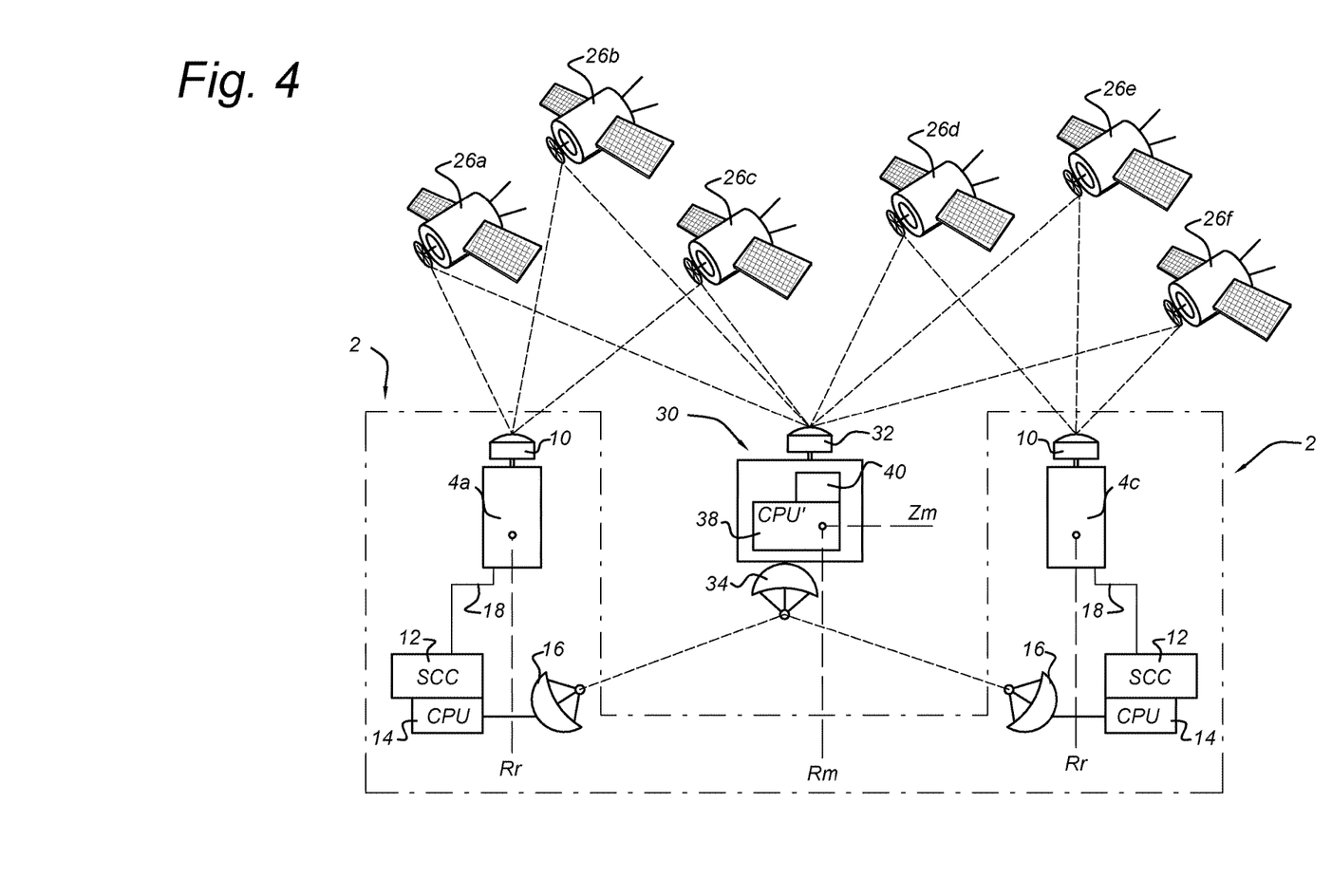
FIG. 4 shows a configuration of the invention in which an additional reference station provides for a multi-baseline solution.

In FIG. 4 a further situation is disclosed in which the GNS signal correction system 2 comprises an additional reference station 4c within range of the mobile 30. This may be the situation where a vessel is located in mid-atlantic and can perform the method of the invention with one or more reference stations located on Europe or Africa and an additional reference station located in the Americas. In this case, reference station 4a can observe GNSS satellites 26a-c, while additional reference station 4c can observe GNSS satellites 26d-f. The mobile 30 in its present position can observe each of the satellites 26a-f.

In performing the method, the GNS signal correction system 2 causes each reference station 4 a, 4 c to compute the real-valued mixed code-and-phase hardware delays based on observations of those GNSS satellites 26 a-f within range. Each reference station's delays are transmitted to the mobile 30. The mobile 30 uses the delays and its own GNSS observation data to compute a multi-baseline solution. The results of this computation are the floating value hardware delays and their covariance matrix. The computed delays and their covariance matrix are input to e.g. a LAMBDA method as described above, which estimates the integer values of the delays. The delays are the same as the hardware delays Nrm described herein above, but now for more than one baseline. In utilising the delays in such a multi-baseline solution, the mobile 30 applies a weighting to the data based on the distance between the mobile and the respective reference stations 4 a, 4 c. In the present example it is noted that each reference station is provided with an SCC 12. It will nevertheless be understood that additional reference station 4 c may provide its reference data to the SCC located at the first reference station 4 a or both reference stations may transmit to an SCC located elsewhere.

The descriptions above are intended to be illustrative, not limiting. It will be apparent to the person skilled in the art that alternative and equivalent embodiments of the invention can be conceived and reduced to practice, without departing from the scope of the claims set out below.

REFERENCES

[1] Teunissen et al, "PPP-RTK: Results of CORS Network-based PPP with Integer Ambiguity Resolution", Journ. Aeronautics, Astronautics and Aviation, Series A, vol. 42, no. 4, pp. 223-230, 2010

LIST OF FIGURE ELEMENTS

2 GNS signal correction system
4 reference station
4a main reference station
4b further reference station
10 system GNSS receiver
12 system control centre (NCC)
14 system processor unit
16 system signal transmitter
18 data link
26a-c GNSS satellite
30 mobile (rover)
32 mobile GNSS receiver
34 mobile signal receiver
38 mobile processor unit
40 user interface
56 apply system observations Pr, Φr to dynamic system state model
58 apply known station positions Rr to dynamic system state model
60 dynamic system state model (e.g. Kalman filter)
62 predict system state (time update)
64 correct system state (measurement update)
66 estimate mixed code-and-phase system hardware delays dr
68 estimate system ionospheric correction Ir
70 transmit hardware delays dr and/or corrections Ir
72 fix Ni to integer
74 Ni fixed?
76 continue with floating value dynamic system state estimation
78 switch to fixed Ni integer value dynamic system state estimation
80 apply integer fixed Ni to dynamic system state model
84 receive system hardware delays dr and/or corrections Ir
86 apply mobile observations Pm, Φm to dynamic mobile state model
88 apply system hardware delays dr to dynamic mobile state model
90 dynamic mobile state model (e.g. Kalman filter)
92 predict mobile state (time update)
94 correct mobile state (measurement update)
96 estimate mixed code-and-phase mobile hardware delays dm
98 estimate mobile earth position Rm
100 fix Nrm to integer
102 Nrm fixed?
104 continue with floating value dynamic mobile state estimation
106 switch to fixed Nrm integer value dynamic mobile state estimation
108 apply integer fixed Nrm to dynamic mobile state model
Pr pseudo range (code) system observation
Φr carrier phase (carrier) system observation
Pm pseudo range (code) mobile observation
Φm carrier phase (carrier) mobile observation
Qm mobile covariance matrix
fi carrier frequency
dr satellite-single differenced mixed code-and-phase system hardware delays
dm satellite-single differenced mixed code-and-phase mobile hardware delays
Nab satellites-and-stations-double-differenced hardware delays
Nrm satellites-and-station-mobile-double-differenced hardware delays
Ir system ionospheric correction
Iw weighted ionospheric correction
Tr system tropospheric correction
Rr reference station position
Rm mobile position
Zm mobile vertical position component
ΔR mobile-to-station distance

The invention claimed is:

1. A method for calculating global navigation satellite system (GNSS) corrections for transmission to a mobile, using a global navigation satellite (GNS) signal correction system comprising a reference station and a system signal transmitter, the method comprising:
acquiring at the reference station GNSS data comprising pseudo range system observations and carrier phase system observations from a plurality of GNSS satellites transmitted over multiple epochs;
applying the GNSS data received from the reference station to a dynamic system state model having the pseudo range system observations and carrier phase system observations as measurements;
dynamically estimating satellite-single-differenced floating value mixed code-and-phase system hardware delays for distinct carrier phase observations via the dynamic system state model; and transmitting the mixed code-and-phase system hardware delays to the mobile in real time via the system signal transmitter to improve at least one of an accuracy and a convergence time for estimating a mobile earth position.

2. The method according to claim 1, wherein the dynamic system state model is defined by:

$$p_{i,r}^{s}(t)=R_{r}^{s}(t)+T_{r}^{s}(t)+b_{p_{i,r}}(t)+d_{p_{i},p_{1},r}^{s,ref}(t)+\gamma_{i}I_{r}^{s,ref}(t)$$

$$\phi_{i,r}^{s}(t)=R_{r}^{s}(t)+T_{r}^{s}(t)+b_{\phi_{i,r}}^{ref}(t)+d_{\phi_{i},p_{1},r}^{s,ref}(t)-\gamma_{i}I_{r}^{s,ref}(t)$$

wherein:
s is a satellite index;
r is a reference station index;
i is a carrier frequency index;
$p_{i,r}^{s}(t)$ are the pseudo range system observations;
$\phi_{i,r}^{s}(t)$ are the carrier phase system observations;
$R_{r}^{s}(t)$ are distances $\|R_{r}(t)-R^{s}(t)\|$ between a known reference station position and a GNSS satellite position;
$T_{r}^{s}(t)$ are system tropospheric delays;
$b_{p_{i,r}}^{ref}(t)$ and $b_{\phi_{i,r}}^{ref}(t)$ are code system clock biases and phase system clock biases, respectively;
$d_{p_{i},p_{1},r}^{s,ref}(t)$ are satellite-single-differenced floating value code-code system hardware delays;
$d_{\phi_{i},p_{1},r}^{s,ref}(t)$ are the satellite-single-differenced mixed code-and-phase system hardware delays;
$I_{r}^{s,ref}(t)$ are satellite-single-differenced system ionospheric corrections, and
$\gamma_{i}=\lambda_{i}^{2}/\lambda_{1}^{2}$, with $\lambda_{i}$ a carrier wavelength for a corresponding carrier frequency ($f_{i}$).

3. The method according to claim 1, wherein the mixed code-and-phase system hardware delays are defined by:

$$d_{\phi_{i},p_{1},r}^{s,ref}(t) = d_{\phi_{i},r}^{s,ref}(t) + \frac{\gamma_{i}}{\gamma_{1}} d_{p_{1},r}^{s,ref}(t)$$

wherein:
$d_{\phi_{i},r}^{s,ref}$ are satellite-single-differenced phase system hardware delays,
$d_{p_{i},r}^{s,ref}$ are satellite-single-differenced code system hardware delays.

4. The method according to claim 1, wherein the GNS signal correction system comprises an additional reference station, and wherein the method further comprises:
dynamically estimating satellite-single-differenced mixed code-and-phase system hardware delays for the reference station and the additional reference station;
assuming satellites-and-stations-double-differenced hardware delays to have an integer value, according to:

$$d_{\phi_{i},p_{1},b}^{s,ref}(t)-d_{\phi_{i},p_{1},a}^{s,ref}(t)=\lambda_{i}N_{i,a,b}^{s,ref}; N_{i,a,b}^{s,ref}\in N$$

wherein
$N_{i,a,b}^{s,ref}$ are the satellites-and-stations-double-differenced hardware delays;
dynamically fixing the satellites-and-stations-double-differenced hardware delays to an integer value; and
transmitting the resulting single set of mixed code-and-phase system hardware delays to the mobile in real time via the system signal transmitter.

5. A method of claim 1, further comprising:
acquiring at an additional reference station further GNSS data;
applying the further GNSS data received from the additional reference station to the dynamic system state model;
dynamically estimating further satellite-single-differenced floating value mixed code-and-phase system hardware delays for the distinct carrier phase observations via the dynamic system state model; and
transmitting, from the additional reference station, the further mixed code-and-phase system hardware delays to the mobile in real time as a separate set of correction data.

6. The method according to claim 5, further comprising applying a weighting to the separate sets of correction data at the mobile based at least in part on a distance between the mobile and the reference station and the additional reference station.

7. The method according to claim 5, wherein the reference station acquires GNSS data from a first set of satellites and the additional reference station acquires GNSS data from a second set of satellites at least partially different from the first set.

8. The method according to claim 1, further comprising:
dynamically estimating system ionospheric corrections simultaneously with the mixed code-and-phase system hardware delays, and
transmitting the system ionospheric corrections to the mobile via the system signal transmitter.

9. The method according to claim 8, wherein the system ionospheric corrections are defined by:

$$I_{r}^{s,ref}(t)=I_{r}^{s}(t)-I_{r}^{ref}(t)+d_{p_{1},r}^{s,ref}(t)$$

wherein $I_{r}^{s}(t)-I_{r}^{ref}(t)$ are satellite-single-differenced ionospheric corrections, and $d_{p_{1},r}^{s,ref}$ are satellite-single-differenced code system hardware delays.

10. A method for determining a mobile earth position, comprising:
providing the mobile comprising a mobile GNSS receiver at the mobile earth position;
acquiring GNSS data comprising pseudo range mobile observations and carrier phase mobile observations from a plurality of GNSS satellites transmitted over multiple epochs;
receiving GNSS corrections from a GNS signal correction system in real time, the GNSS corrections comprising satellite-single-differenced mixed code-and-phase system hardware delays;
applying the mixed code-and-phase system hardware delays to a dynamic mobile state model having the pseudo range mobile observations and carrier phase mobile observations as measurements, to improve at least one of an accuracy and a convergence time for estimating the mobile earth position, and
dynamically estimating the mobile earth position via the dynamic mobile state model.

11. The method according to claim 10, wherein the dynamic mobile state model is defined by:

$$p_{i,m}^{s}(t)=R_{m}^{s}(t)+T_{m}^{s}(t)+b_{p_{i},m}(t)+d_{p_{i},p_{1},m}^{s,ref}(t)+\gamma_{i}I_{m}^{s,ref}(t)$$

$$\phi_{i,m}^{s}(t)-d_{\phi_{i},p_{1},r}^{s,ref}=R_{m}^{s}(t)+T_{m}^{s}(t)+b_{\phi_{i},m}^{ref}(t)+d_{\phi_{i},p_{1},m}^{s,ref}(t)-d_{\phi_{i},p_{1},r}^{s,ref}(t)-\gamma_{i}I_{m}^{s,ref}(t)$$

wherein:
s is a satellite index;
m is a mobile index;
i is a carrier frequency index;
$p_{i,m}^{s}(t)$ are the pseudo range mobile observations;
$\phi_{i,m}^{s}(t)$ are the carrier phase mobile observations;
$R_{m}^{s}(t)$ are distances $\|R_{m}(t)-R^{s}(t)\|$ between the mobile earth position and a GNSS satellite position;
$T_{m}^{s}(t)$ are mobile tropospheric delays;

$b_{p_i,m}^{ref}(t)$ and $b_{\phi_i,m}^{ref}(t)$ are code mobile clock biases and phase mobile clock biases respectively;

$d_{p_i,p_1,m}^{s,ref}(t)$ are satellite-single-differenced floating value code-code mobile hardware delays;

$d_{\phi_i,p_1,m}^{s,ref}(t)$ are the satellite-single-differenced mixed code-and-phase mobile hardware delays (dm);

$d_{\phi_i,p_1,r}^{s,ref}(t)$ are the received satellite-single-differenced mixed code-and-phase system hardware delays;

$I_m^{s,ref}(t)$ are satellite-single-differenced mobile ionospheric corrections, and $\gamma_i = \lambda_i^2/\lambda_1^2$, with $\lambda_i$ a carrier wavelength for the corresponding carrier frequency ($f_i$).

12. The method according to claim 10, further comprising:
assuming satellites-and-system-mobile double-differenced hardware delays to have an integer value, according to:

$$d_{\phi_i,p_1,m}^{s,ref}(t) - d_{\phi_i,p_1,r}^{s,ref}(t) = \lambda_i N_{i,m,r}^{s,ref}; N_{i,m,r}^{s,ref} \in N;$$

wherein $N_{i,m,r}^{s,ref}$ are the satellites-and-system-mobile-double-differenced hardware delays; and
dynamically fixing the satellites-and-system-mobile-double-differenced hardware delays to an integer value.

13. The method according to claim 12, wherein, after dynamically fixing the satellites-and-system-mobile-double-differenced hardware delays to an integer value, the carrier phase mobile observations in the dynamic mobile state model are defined by:

$$\phi_{i,m}^s(t) - d_{\phi_i,p_1,r}^{s,ref}(t) - \lambda_i N_{i,m,r}^{s,ref} = R_m^s(t) + T_m^s(t) + b_{\phi_i,m}^{ref}(t) - \gamma_i I_m^{s,ref}(t).$$

14. The method according to claim 10, further comprising:
receiving from the GNS signal correction system, ionospheric corrections;
obtaining weighted system ionospheric corrections, based on a calculated distance between the mobile earth position and a station earth position, and
applying the weighted system ionospheric corrections to the dynamic mobile state model to improve the accuracy or convergence time of dynamic estimation of the mobile earth position or both.

15. A global navigation satellite (GNS) signal correction system for estimating and transmitting global navigation satellite system (GNSS) corrections to a mobile, the GNS signal correction system comprising:
a reference station comprising:
a system GNSS receiver configured to acquire GNSS data comprising pseudo range system observations and carrier phase system observations from a plurality of GNSS satellites transmitted over multiple epochs;
a system control center, configured to receive the GNSS data from the reference station in real time, and comprising:
a system processor unit configured to apply the GNSS data to a dynamic system state model having the pseudo range system observations and carrier phase system observations as measurements; and
a system signal transmitter configured to transmit signals to the mobile;
wherein the system processor unit is configured to dynamically estimate the GNSS corrections comprising satellite-single-differenced mixed code-and-phase system hardware delays for distinct carrier phase observations and carrier frequencies,
and the system control center is configured to transmit the mixed code-and-phase hardware delays in real time.

16. The GNS signal correction system according to claim 15, further comprising an additional reference station, wherein the system control center is configured to:
dynamically estimate the satellite-single-differenced mixed code-and-phase system hardware delays for the reference station and the additional reference station, and
dynamically fix satellites-and-stations-double-differenced hardware delays to an integer value.

17. The GNS signal correction system according to claim 15, further comprising an additional reference station configured to:
acquire further GNSS data;
apply the further GNSS data to the dynamic system state model;
dynamically estimate further satellite-single-differenced floating value mixed code-and-phase system hardware delays for the distinct carrier phase observations via the dynamic system state model; and
transmit the further mixed code-and-phase system hardware delays to the mobile in real time as a separate set of correction data.

18. The GNS signal correction system according to claim 15, wherein the system control center is configured to:
dynamically estimate system ionospheric corrections, and
transmit the system ionospheric corrections to the mobile via the system signal transmitter.

19. A mobile, comprising:
a mobile GNSS receiver configured to acquire GNSS data comprising pseudo range mobile observations and carrier phase mobile observations from a plurality of GNSS satellites transmitted over multiple epochs;
a mobile signal receiver configured to receive GNSS corrections from a system control center, wherein the GNSS corrections comprise satellite-single-differenced mixed code-and-phase system hardware delays; and,
a mobile processing unit configured to apply the mixed code-and-phase system hardware delays to a dynamic mobile state model having the pseudo range mobile observations and carrier phase mobile observations as measurements to improve at least one of an accuracy and a convergence time for estimating a mobile earth position, and for deriving a mobile earth position.

20. The mobile according to claim 19, arranged to receive the system ionospheric corrections from the GNS signal correction system, wherein the mobile processing unit is configured to weight the system ionospheric corrections based on a calculated distance between the reference station earth position and the mobile earth position, and to apply weighted ionospheric corrections to the dynamic mobile state model, so as to improve an accuracy or a convergence time for dynamic estimation of the mobile earth position or both.

21. The mobile according to claim 19, further comprising a user interface configured to adjust at least one mobile covariance matrix value of the dynamic mobile state model, so as to improve a dynamic estimation accuracy of a vertical component of the mobile earth position.

22. At least one non-transitory computer readable medium storing instructions, which when executed by one or more processors, causes the one or more processors to:
receive GNSS data comprising pseudo range system observations and carrier phase system observations acquired by a reference station from a plurality of GNSS satellites transmitted over multiple epochs;

apply the pseudo range system observations and carrier phase system observations to a dynamic system state model having the pseudo range system observations and carrier phase system observations as measurements;

dynamically estimate satellite-single-differenced floating value mixed code-and-phase system hardware delays for distinct carrier phase observations via the dynamic system state model, and store the mixed code-and-phase system hardware delays for transmission to a mobile in real time via a system signal transmitter, to enable a mobile processing unit of the mobile to apply the mixed code-and-phase system hardware delays to the dynamic mobile state model, to improve at least one of an accuracy and a convergence time for estimating a mobile earth position.

23. At least one non-transitory computer readable medium storing instructions which when executed by a processor, cause the processor to:

receive GNSS data comprising pseudo range mobile observations and carrier phase mobile observations acquired by a mobile receiver from a plurality of GNSS satellites transmitted over multiple epochs;

apply the pseudo range mobile observations and carrier phase mobile observations to a dynamic system state model having the pseudo range system observations and carrier phase system observations as measurements;

apply GNSS corrections comprising satellite-single-differenced mixed code-and-phase system hardware delays received from a GNS signal correction system to the dynamic mobile state model, to improve at least one of an accuracy and a convergence time for estimating a mobile earth position, and dynamically estimate a mobile earth position using the dynamic mobile state model.

* * * * *